(12) United States Patent
Nago

(10) Patent No.: US 10,050,477 B2
(45) Date of Patent: Aug. 14, 2018

(54) POWER TRANSMISSION DEVICE, CONTROL METHOD FOR POWER TRANSMISSION DEVICE, AND STORAGE MEDIUM

(71) Applicant: CANON KABUSHIKI KAISHA, Tokyo (JP)

(72) Inventor: Hidetada Nago, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 229 days.

(21) Appl. No.: 15/185,975

(22) Filed: Jun. 17, 2016

(65) Prior Publication Data

US 2016/0372977 A1    Dec. 22, 2016

(30) Foreign Application Priority Data

Jun. 19, 2015   (JP) ................................. 2015-124267

(51) Int. Cl.
| | |
|---|---|
| *H02J 5/00* | (2016.01) |
| *H02J 7/00* | (2006.01) |
| *H02J 50/00* | (2016.01) |
| *H02J 50/12* | (2016.01) |
| *H02J 50/80* | (2016.01) |
| *H02J 50/40* | (2016.01) |
| *H02J 7/02* | (2016.01) |
| *H02J 50/90* | (2016.01) |

(52) U.S. Cl.
CPC ............. *H02J 50/12* (2016.02); *H02J 50/00* (2016.02); *H02J 50/40* (2016.02); *H02J 50/80* (2016.02); *H02J 7/025* (2013.01); *H02J 50/90* (2016.02)

(58) Field of Classification Search
CPC .. H02J 50/12; H02J 50/00; H02J 50/40; H02J 50/80; H02J 50/90; H02J 7/025
See application file for complete search history.

(56) References Cited

U.S. PATENT DOCUMENTS

| | | | | |
|---|---|---|---|---|
| 6,671,270 B2 * | 12/2003 | Nago | .................. | H04B 7/2681 370/350 |
| 8,995,355 B2 * | 3/2015 | Nago | .................. | H04W 28/20 370/328 |

FOREIGN PATENT DOCUMENTS

| | | |
|---|---|---|
| JP | 2013212004 A | 10/2013 |
| JP | 5544705 B2 | 7/2014 |
| JP | 2014212662 A | 11/2014 |
| JP | 2015008618 A | 1/2015 |
| JP | 2015027239 A | 2/2015 |
| JP | 2015042050 A | 3/2015 |

\* cited by examiner

*Primary Examiner* — Kenneth B Wells
(74) *Attorney, Agent, or Firm* — Canon U.S.A., Inc. IP Division

(57) ABSTRACT

A power transmission device sets, as a target of power transmission, a second power reception device that has transmitted a notification signal including predetermined information while power transmission, using electromagnetic waves modulated to transmit the predetermined information, is being performed to a first power reception device, where the setting the second power reception device as a target of the power transmission performed is performed depending on a result of a negotiation with the second power reception device.

11 Claims, 7 Drawing Sheets

POWER TRANSMISSION DEVICE, CONTROL METHOD FOR POWER TRANSMISSION DEVICE, AND STORAGE MEDIUM

BACKGROUND OF THE INVENTION

Field of the Invention

The present invention relates to wireless power transmission.

Description of the Related Art

There is conventionally known a wireless power transmission system including a power transmission device that wirelessly transmits power and a power reception device that receives the power supplied from the power transmission device. In the wireless power transmission system, the power transmission device detects the power reception device present in a power transmittable range through detecting power transmission with small power. Then, authentication processing, based on authenticating power transmission, is executed for the detected power reception device. When the authentication processing is successful, the power transmission device performs charging power transmission, with larger power, for the power reception device (Japanese Patent Application Laid-Open No. 2013-212004). In another known wireless power transmission system, a power transmission device can concurrently transmit power to a plurality of power reception devices.

A power reception device might communicate with a power transmission device different from a power transmission device that is supposed to be its power supply source, when a plurality of power transmission devices is closely arranged and communication ranges thereof overlap one another, in which control information is transmitted and received and communications for wireless power transmission such as the authentication processing are performed.

A case is described where a first power transmission device and a second power transmission device are disposed at positions where their communication ranges overlap one another. A third power reception device is placed on the first power transmission device, while the first power transmission device is transmitting power to a first power reception device and the second power transmission device is transmitting power to a second power reception device.

In such a state, the first and the second power transmission devices have already started the charging power transmission with large power, so that the first and the second power transmission devices cannot perform detecting power transmission. As a result, the third power reception device starts communication connection processing for the authentication processing, when detecting the charging power transmission being performed by the first power transmission device for the first power reception device. In such a case, when the third power reception device broadcasts a message for the communication connection processing, the message is received by each of the first power transmission device and the second power transmission device.

Normally, the second power transmission device does not necessarily have to transmit power to the third power reception device, which is not placed thereon. However, when the message from the third power reception device is received, the second power transmission device might establish communication connection with the third power reception device for performing the wireless power transmission. The second power transmission device might execute the authentication processing with the third power reception device in response to the established communication connection, and set the third power reception device as a target of the power transmission. When the second power transmission device sets the third power reception device that is not placed thereon as the target of the power transmission, inefficient power transmission is performed for the third power reception device.

SUMMARY OF THE INVENTION

According to an aspect of the present invention, a power transmission device sets, as a target of power transmission, a second power reception device that has transmitted a notification signal including predetermined information while power transmission, using electromagnetic waves modulated to transmit the predetermined information, is being performed to a first power reception device, where the setting is performed depending on a result of a negotiation with the second power reception device.

Further features of the present invention will become apparent from the following description of exemplary embodiments with reference to the attached drawings.

DESCRIPTION OF THE EMBODIMENTS

In a first exemplary embodiment, a power transmission device is prevented from setting a power reception device present in a power transmission range of the power transmission device as a power transmission target.

Figure 1:
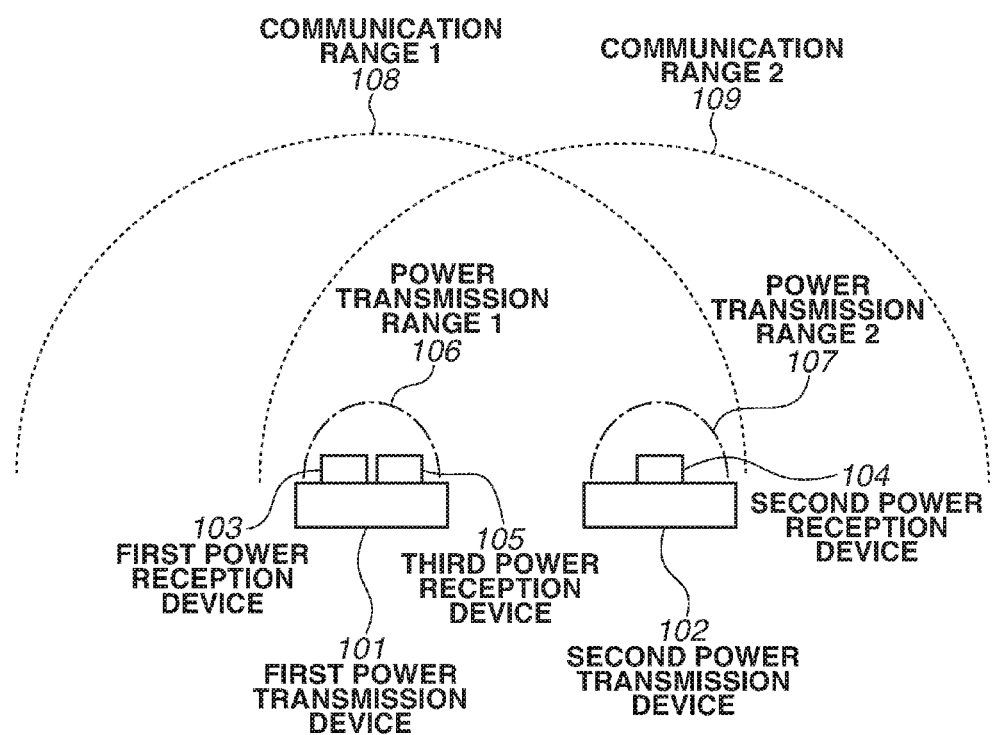
FIG. 1 is a diagram illustrating a configuration of a wireless power transmission system.

FIG. 1 illustrates a wireless power transmission system according to the present exemplary embodiment. The wireless power transmission system according to the present exemplary embodiment employs a magnetic field resonance system for performing wireless power transmission. The magnetic field resonance system is a method for transmitting power through coupling between resonators (resonating elements) of the power transmission device and power reception device using resonation in magnetic fields thereof. The wireless power transmission method (contactless power transmission method) is not limited to the magnetic field resonance system, and a power transmission method employing electromagnetic induction, resonant electromagnetic field coupling, microwaves, a laser beam, or the like may be used.

In FIG. 1, the wireless power transmission system includes a first power transmission device 101, a second power transmission device 102, a first power reception device 103, a second power reception device 104, and a third power reception device 105. The first power transmission device 101 and the second power transmission device 102 each wirelessly transmit power. The first power reception device 103, the second power reception device 104, and the third power reception device 105 each receive the wirelessly transmitted power. In the wireless power transmission system according to the present exemplary embodiment, communication for authentication and transmission and reception of control information for controlling wireless power transmission are performed between the power transmission devices and the power reception devices. The transmission and reception of power between the devices are hereinafter referred to as transmit power, receive power, or power transmission (wireless power transmission). The communication for the authentication and the transmission and reception of the control information between the devices is simply referred to as communication (wireless communications).

In FIG. 1, the first power transmission device 101 can perform power transmission within a power transmission range 106, and can perform communication within a communication range 108. The second power transmission device 102 can perform power transmission within a power transmission range 107, and can perform communication within a communication range 109. As illustrated in FIG. 1, in the wireless power transmission system according to the present exemplary embodiment, the communication range of the power transmission device is wider than the power transmission range of the power transmission device. This is because the wireless power transmission and the wireless communications use a different frequency bandwidth of electric waves, and a reachable range of the electric waves used for one is different from that used for the other. The wireless power transmission involves a loss increasing with the distance and a large influence by an object within the power transmission range. For that reason, the power transmission range of the wireless power transmission is generally smaller than the communication range of the wireless communication. When the output power of the electric waves for the wireless communications is reduced to set the communication range of the wireless communication to be the same as the power transmission range of the wireless power transmission, accurate communications might not be conducted. Accordingly, in the wireless power transmission system of the present exemplary embodiment, the reachable ranges of the electric waves used for respective purposes are set in such a manner that the power transmission range of the power transmission device is smaller than the communication range.

Communication performed between the devices in the wireless power transmission system according to the present exemplary embodiment conforms to a standard known as Bluetooth (registered trademark) 4.0. Bluetooth Low Energy (BLE), which is a communication method involving relatively low power consumption, is defined in Bluetooth (registered trademark) 4.0. In the wireless power transmission system, each of the power transmission devices operate as a central device that is a master station in a network as defined in BLE. The power transmission device needs to communicate with each of a plurality of power reception devices, to concurrently transmit power to the plurality of power reception devices. Thus, the power transmission device operates as the central device to communicate with each of the plurality of power reception devices. Each of the power reception devices operates as a peripheral device that establishes connections with the central device, and performs communications based on control performed by the central device, as defined in BLE. Alternatively, the power transmission device may operate as the peripheral device, and the power reception device may operate as the central device.

The communication according to the present exemplary embodiment, which conforms to BLE as described above, may conform to another communication standard. For example, a predetermined wireless local area network (LAN) (The Institute of Electrical and Electronics Engineers, Inc. (IEEE) 802.11 series) may be employed. The communication according to the present exemplary embodiment may conform to Near Field Communication (NFC), ZigBee, or the like. The communications may employ a unique communication method or a load modulation. In the present exemplary embodiment, the number of power transmission devices is two, and the number of power reception devices is three. Alternatively, the number of each of such devices may be three or more.

Figure 2:
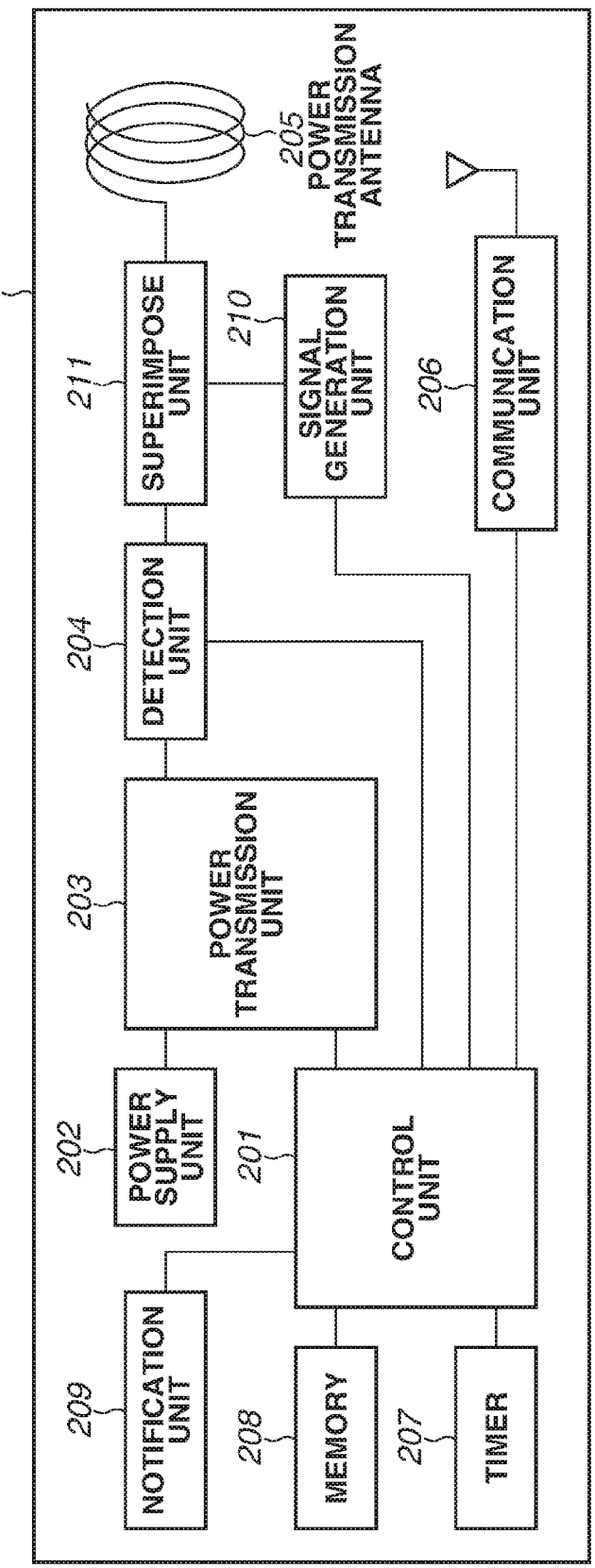
FIG. 2 is a block diagram illustrating a configuration of a power transmission device.

Next, a configuration of each device in the wireless power transmission system will be described. FIG. 2 is a block diagram illustrating a configuration of a power transmission device 200 (the first power transmission device 101 and the second power transmission device 102) in the wireless power transmission system. The power transmission device 200 includes a control unit 201, a power supply unit 202, a power transmission unit 203, a detection unit 204, a power transmission antenna 205, a communication unit 206, a timer 207, a memory 208, a communication unit 209, a signal generation unit 210, and a superimpose unit 211.

The control unit 201 controls the power transmission device 200. For example, the control unit 201 is a central processing unit (CPU) including the timer 207 and the memory 208. The control unit 201 executes a control program, stored in the memory 208, to control the entire device. The control unit 201 also uses the memory 208 to store a value of a variable while executing the control program. The memory 208 includes a read only memory (ROM), a random access memory (RAM), a hard disk drive (HDD), a flash memory, an attachable and detachable secure digital (SD) card, or an appropriate combination of these. The control unit 201 uses the timer 207 to measure time.

The power supply unit 202 supplies power to be used for the wireless power transmission performed by the power transmission device 200. The power supply unit 202 is a commercial power supply unit or battery. The power transmission unit 203 converts direct current (DC) or alternating current (AC) input from the power supply unit 202 into AC frequency power corresponding to a transmission band, and generates electromagnetic waves to be received by the power reception device via the power transmission antenna 205. The power transmission unit 203 adjusts the intensity of the electromagnetic waves in such a manner as to perform one of detecting power transmission, authenticating power transmission, and charging power transmission (described below), based on an instruction from the control unit 201, through the transmission antenna 205. The intensity is adjusted through adjustment of voltage (power transmission voltage) to be input to the power transmission antenna 205. The intensity of the electromagnetic wave increases as the power transmission voltage increases. The power transmission unit 203 performs control to stop power transmission through the power transmission antenna 205, based on an instruction from the control unit 201.

The detection unit 204 detects values of the power transmission voltage and current (power transmission current) at the power transmission antenna 205. The control unit 201 reads the power transmission voltage and the power transmission current detected by the detection unit 204. When the correlation between the power transmission voltage and current, and the voltage and current to be input to the power transmission unit 203 from the power supply unit 202 is known, the detection unit 204 may detect the voltage and the current to be input to the power transmission unit 203.

The communication unit 206 communicates with the power reception devices. The communication unit 206 includes a chip for controlling wireless communication conforming to BLE and an antenna for signal communication. The communication unit 209 notifies a user of information. The communication unit 209 performs display control through which a display unit such as a liquid crystal display (LCD) displays information based on an instruction from the control unit 201. The communication unit 209 may use a display unit other than the LCD, or may include a speaker for notifying the user of the information with voice.

The signal generation unit 210 generates predetermined information. The signal generation unit 210 generates information based on random numbers, a predetermined bit string, or unique identification information. For example, the signal generation unit 210 generates information based on random numbers of eight bits with start and stop bits of several bits added at the start and the end. The superimpose unit 211 superimposes the information generated by the signal generation unit 210, on the electromagnetic waves used for power transmission, and outputs a signal as a result of the superimposing through the power transmission antenna 205. To transmit the information generated by the signal generation unit 210, the superimpose unit 211 modulates a medium such as the electromagnetic wave used for the power transmission into a signal in a form from which the communication partner device can extract the information. More specifically, the superimpose unit 211 modulates the medium for transmitting power such as the electromagnetic waves, magnetic field energy, or electric field energy.

The power transmission device 200 is not limited to a device dedicated to power transmission, and may be another device such as a printer, a personal computer, for example.

Next, a configuration of a power reception device 300 (the first power reception device 103, the second power reception device 104, and the third power reception device 105) in the wireless power transmission system is described with reference to FIG. 3. The power reception device 300 includes a control unit 301, a battery 302, a power reception unit 303, a detection unit 304, a power reception antenna 305, a communication unit 306, a timer 307, a memory 308, a switch 309, and a full charge detection unit 310.

The control unit 301 controls the power reception device 300. The control unit 301 is a CPU including the timer 307 and the memory 308, as in the case of the control unit 201. The communication unit 306 includes a chip for controlling the wireless communications conforming to BLE and an antenna for transmitting a signal. The power reception antenna 305 receives power wirelessly supplied from the power transmission device 200. The power reception unit 303 generates power from the electromagnetic waves received through the power reception antenna 305. The electromagnetic waves received through the power reception antenna 305 cause resonation in the power reception unit 303, producing AC power through the resonation. The power reception unit 303 converts the AC power into DC power or AC power with a predetermined frequency, and outputs the resultant power. The battery 302 is rechargeable. The power reception device 300 charges the battery 302 with the output from the power reception unit 303. When information is superimposed on the electromagnetic waves received through the power reception antenna 305, the power reception unit 303 extracts the information. In other words, the power reception unit 303 can acquire superimposed information by demodulating the electromagnetic waves in a signal in a certain form on which predetermined information is superimposed, received through the power reception antenna 305.

The full charge detection unit 310 detects the voltage of the battery 302. The control unit 301 can detect whether the battery 302 is fully charged, and a charged state of the battery 302, based on a result of the detection by the full charge detection unit 310. The control unit 301 controls the switch 309 so that the received power is output or not output to the battery 302. The power is output to the battery 302 when the switch 309 is ON. The power is not output to the battery 302 but is output to the power reception unit 303, the control unit 301, and the communication unit 306 when the switch 309 is OFF. The switch 309 is OFF in the initial state.

The detection unit 304 detects electromotive force (received voltage) generated in the reception antenna 305 by the electromagnetic waves transmitted from the power transmission antenna 205. The control unit 301 can refer to the received voltage detected by the detection unit 304. The detection unit 304 may detect the voltage output from the power reception unit 303, as in the case of the detection unit 204 described above.

The power reception unit 303, the control unit 301, and the communication unit 306 of the power reception device 300 may be operated by the power transmitted from the power transmission device 200. With such a configuration, the power reception device 300 can start communication with the power transmission device 200, even when there is not enough power for starting the wireless power transmission from the power transmission device 200. The power reception unit 303, the control unit 301, and the communication unit 306 may be operated by the power supplied from the battery 302.

Examples of the power reception device 300 may include a device such as a digital camera or a mobile phone.

Figure 3:
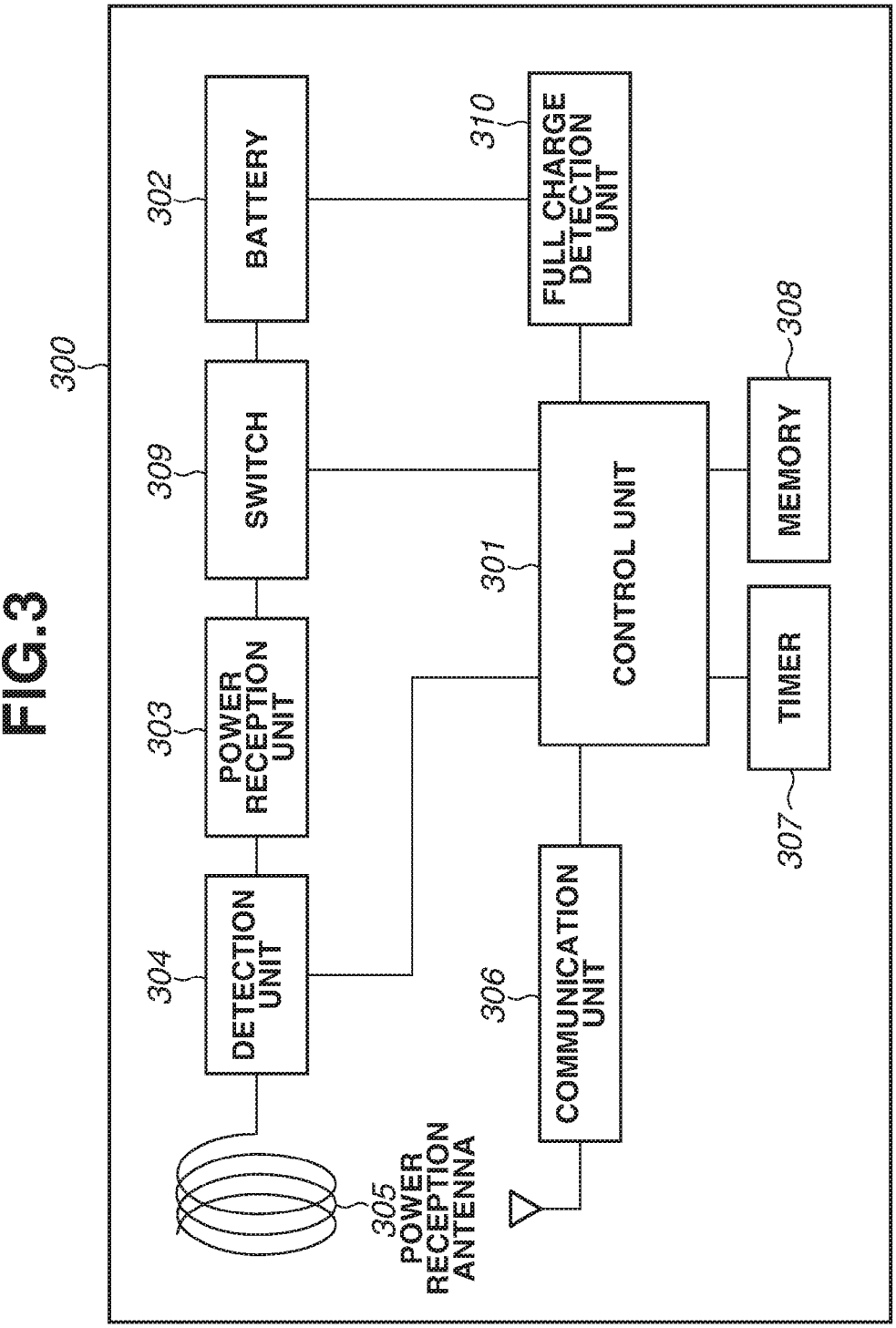
FIG. 3 is a block diagram illustrating a configuration of a power reception device.

The configuration illustrated in each of FIGS. 2 and 3 is merely an example. The power transmission device 200 and the power reception device 300 may include a hardware configuration other than the hardware configuration illustrated in FIGS. 2 and 3. For example, the power transmission device 200 and the power reception device 300 may each include an operation unit used by the user to perform various inputs and the like to operate the device.

The power transmission device 200 in the wireless power transmission system having the configuration described above selectively performs one of the detecting power transmission, the authenticating power transmission, and the charging power transmission.

The detecting power transmission is power transmission performed to detect whether at least one object is placed on the power transmission device 200. While the detecting power transmission is being performed, the power transmission device 200 intermittently generates weak electromagnetic waves through the power transmission antenna 205. In this manner, the power consumed while no object is placed can be made small. When an object is placed within the power transmission range of the power transmission device 200 while the detecting power transmission is being performed, the power for the detecting power transmission is consumed by the object. In other words, the object receives the power for the detecting power transmission. In such a case, the impedance of the power transmission antenna 205 of the power transmission device 200 changes, and thus current that is different from that in a normal state where no object receiving power is placed flows in the power transmission antenna 205. The detection unit 204 can detect that the object is placed within the power transmission range of the corresponding power transmission device 200 by detecting this change. The power transmission device 200 detects an object within the power transmission range, based on a result of detecting an amount of electric change in at least one of the current, voltage, and the impedance of the power transmission antenna 205.

The power transmission device 200 stores in advance a value of change of the detection result obtained by the detection unit 204 in a case where the power reception device 300 is in the power transmission range. The power transmission device 200 detects that an object is placed within the power transmission range, when the detection result obtained by the detection unit 204 indicates an amount of change, from the normal state, exceeding the value of change stored in advance. The power transmission device 200 may detect that an object other than the power reception device 300 is in the power transmission range when the detection result obtained by the detection unit 204 indicates an amount of change, from the normal state, not exceeding the value of change stored in advance. In such a case, the power transmission device 200 may execute error processing for performing an operation of stopping the power transmission, an operation of displaying information instructing the removal of the unwanted object, and the like.

The authenticating power transmission is performed for supplying power required for the power reception device in the power transmission range to perform authentication, that is, enough power to start the control unit 301 and the communication unit 306 of the power reception device. The power transmission device 200 starts the authenticating power transmission when the presence of an object within its power transmission range is detected. The authenticating power transmission is different from the detecting power transmission involving the intermittent power transmission in that constant power is continuously transmitted.

The power reception device 300 that has received the power of the authenticating power transmission transmits an advertise packet, for causing the communication partner device to transmit a communication connection request, through the communication unit 306 within a predetermined period (for example, 100 ms) after the detection of the authenticating power transmission. The power transmission device 200 determines that the power reception device 300 is in the power transmission range when receiving the advertise packet from the power reception device 300 as a response to the authenticating power transmission.

The advertise packet is a broadcasted signal defined in BLE. The advertise packet is a notification signal used by a device to notify a BLE supporting device nearby of its presence. The advertise packet includes information indicating the device name and the type of providing service of the device that has transmitted the packet, a version of a protocol used for the communications, and the like. A device uses the advertise packet for notifying the device nearby of its existence and that the device is waiting for the device nearby to establish connection. The advertise packet from the power reception device 300 includes service information indicating that the power reception device 300 supports a wireless power transmission method employed by the system. The advertise packet is hereinafter referred to as a presence notification.

The power transmission device 200 stops the authenticating power transmission when no present notification from the power reception device 300 is received within a predetermined period (for example, 100 ms) after the start of the authenticating power transmission. Then, the power transmission antenna 205 again intermittently generates the electromagnetic waves through the power transmission antenna 205 to perform the detecting power transmission.

The power transmission device 200 transmits a connection request packet (connection request) to the power reception device 300 that has transmitted the received presence notification, through the communication unit 206. The power transmission device 200 establishes the communication connection with the power reception device 300 in accordance with the transmitted connection request. Then, the authentication processing involving a negotiation for power transmission is executed between the devices through the established wireless connection. In the authentication processing, capability information is transmitted and received (exchanged) between the power transmission device 200 and the power reception device 300, while the communication connection is established between the power transmission device 200 and the power reception device 300. The capability information indicates a transmittable/receivable amount of power, a hardware configuration, a supporting power transmission method, a version of a supporting power transmission standard, a version of a communication protocol, and the like. In BLE, an event of exchanging a data packet periodically arises and is referred to as a connection event. The power transmission device 200 requests the power reception device 300 to issue a notification indicating a value of the required power, with a data packet transmitted in the first connection event. The power reception device 300 transmits a data packet including the value of the required power, as a response to the request.

The authentication processing is successful when the version of the protocol matches between the power transmission device 200 and the power reception device 300, and when the power requested by the power reception device 300 is equal to or smaller than the transmittable power of the power transmission device 200, and fails when such conditions are not satisfied. When the authentication fails, the negotiation related to the amount of power or the protocol fails (condition unsatisfied) between the power transmission device 200 and the power reception device 300, so that the charging power transmission is not performed. The communication in the authentication processing may be regarded as communication for determining whether the object detected through the detecting power transmission is to be a target of the charging power transmission.

The authentication processing fails also when the information required for the authentication cannot be obtained from the power reception device 300 within a predetermined period after the authenticating power transmission has started. A password for authentication may be transmitted and received between the power transmission device 200 and the power reception device 300. In this case, the authentication is successful when the password transmitted from one of the power transmission device 200 and the power reception device 300 or both is determined to be correct.

The power transmission device 200 can check whether an object present in the power transmission range is the power reception device requesting the power transmission through the authentication processing. On the other hand, the power reception device 300 can check whether the power transmission device, with which the communication connection has been established, can supply power through the authentication processing. While the authentication processing is executed, the power transmission device 200 continuously performs the authenticating power transmission, for causing the power reception device 300 to transmit the capability information.

When the authentication processing is successful, more specifically, when the negotiation with the power reception device 300 is successful, the power transmission device 200 performs the charging power transmission. In the charging power transmission, power larger than the power of the detecting power transmission and the power of the authenticating power transmission is transmitted to the power reception device 300. In other words, the power of the detecting power transmission and the power of the authenticating power transmission are smaller than the power of the charging power transmission.

When the authentication processing is successful, the power transmission device 200 generates random number information based on random numbers with the signal generation unit 210. The information generated by the signal generation unit 210 may be information unique to the power transmission device 200 such as identification information about the power transmission device 200 for example.

When the charging power transmission is performed, the power transmission device 200 receives, from the reception device 300, control information, for controlling the wireless power transmission such as the value of the received power, request issued for increasing/decreasing the value of the transmitted power, and stopping the power transmission. The charging power transmission is based on a request from the power reception device 300. The power transmission device 200 terminates the charging power transmission when a power transmission stop request, issued for stopping the power transmission, is received from the power reception device 300, or when a transmission error occurs. The control information from the power reception device 300 may include error information. For example, the power transmission device 200 may stop the power transmission when receiving the control information indicating that the error has occurred, from the power reception device 300. When the full charge notification is received, indicating that the power reception device 300 is fully charged, the power transmission device 200 stops the charging power transmission for the power reception device 300 that has transmitted the full charge notification.

When the power transmission stop request from one of a plurality of power reception devices is received while the plurality of power reception devices is receiving power from the power transmission device 200, the power transmission device 200 stops the charging power transmission for the power reception device 300 that has transmitted the power transmission stop request, and continues the power transmission for the other power reception devices.

The power reception device 300 turns ON the switch 309 in the OFF state with the control unit 301, to charge the power supplied through the charging power transmission, when the authentication processing is successful. In other words, the power reception device 300 prevents the power from being supplied to the battery 302 until the charging power transmission starts. The power reception device 300 turns OFF the switch 309 in the ON state with the control unit 301 to stop the charging.

The power transmission device 200 can transmit power to a plurality of power reception devices. For example, when the charging power transmission for a first power reception device is detected while the power transmission device 200 is performing charging power transmission for the first power reception device, a second power reception device, newly requesting the power transmission, transmits the presence notification to the power transmission device 200. When the presence notification is received, the power transmission device 200 starts the authentication processing for the second power reception device, and starts the charging power transmission for the second power reception device when the authentication processing is successful. In this manner, the power transmission device 200 can concurrently perform the charging power transmission for the plurality of power reception devices.

While the power transmission device 200 performs the charging power transmission, the impedance of the power transmission antenna 205 of the power transmission device 200 changes when the power consumed by the power reception device 300 receiving the power changes. The power transmission device 200 cannot identify whether the impedance change is due to the change in the power consumed by the power reception device 300 receiving the power or due to another power reception device 300 that has newly entered the power transmission range. Consequently, the power transmission device 200 that is performing the charging power transmission cannot detect that the other power reception device 300 has newly entered the power transmission range based on the impedance change.

For that reason, the power transmission device 200 might be incapable of determining whether the transmission source of the presence notification is in its power transmission range when receiving the presence notification while performing the charging power transmission. In the present exemplary embodiment, operations are described below that is executed so as to reduce possibility for a power transmission device to perform the authentication processing and the charging power transmission for a power reception device that is not in the power transmission range of the power transmission device 200 and is in a power transmission range of another power transmission device.

Figure 4:
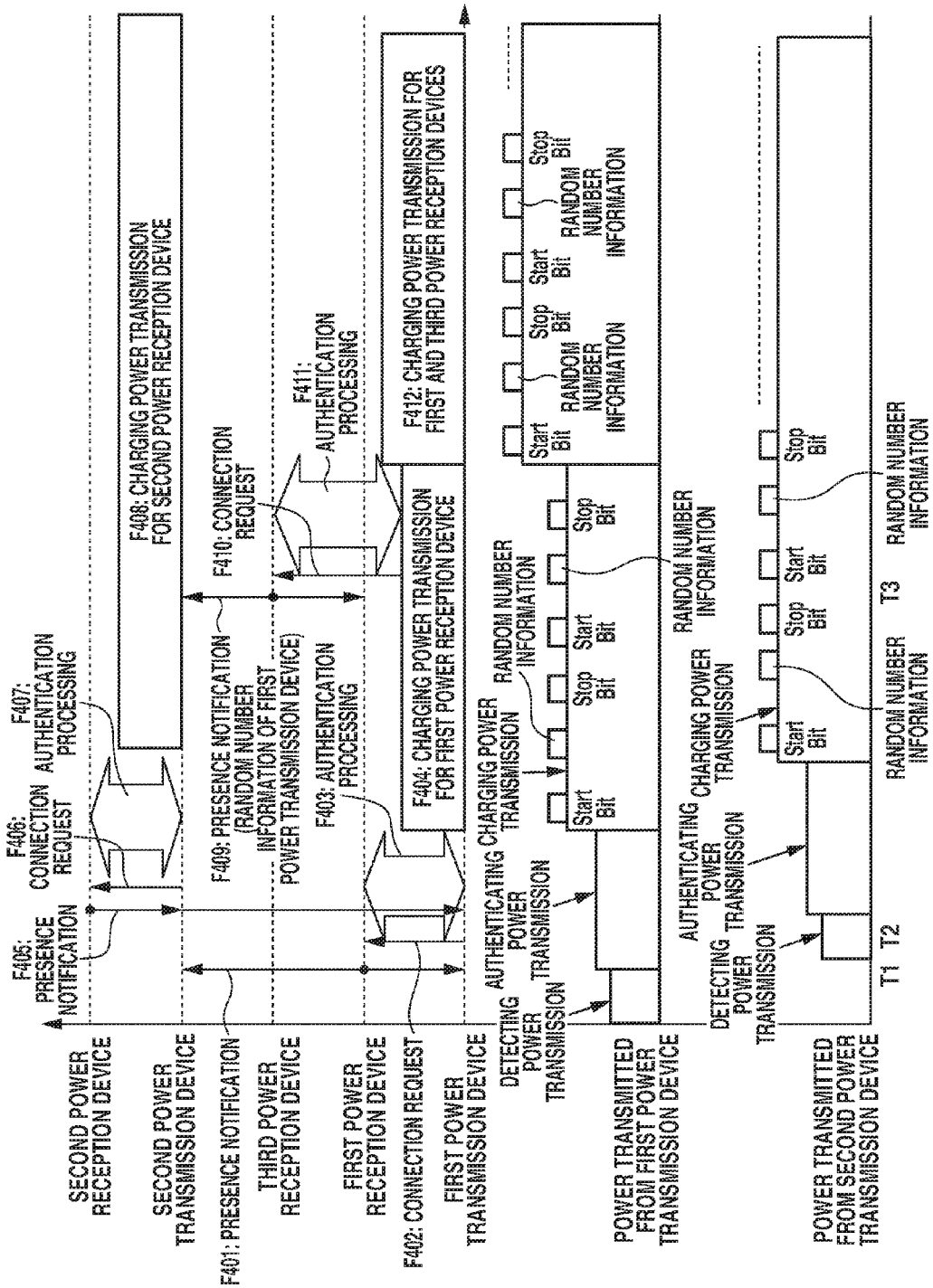
FIG. 4 is diagram illustrating a sequence chart of the wireless power transmission system and power transmitted by power transmission devices.

A flow of the operation in the wireless power transmission system is described with reference to a sequence chart illustrated in FIG. 4. FIG. 4 illustrates communications between devices and power transmitted by the first power transmission device 101 and the second power transmission device 102. When the first power transmission device 101 and the second power transmission device 102 are arranged at positions where their power transmission ranges overlap each other, the devices may each output an error notification such as a warning indicating that the device is under influence of the other power transmission device or a notification instructing the user to move the device away from the power transmission device. When the first power transmission device 101 and the second power transmission device 102 are arranged at positions where their power transmission ranges overlap one another, the devices may each stop the power transmission.

The first power transmission device 101 and the second power transmission device 102 each start the detecting power transmission when detecting the power supply unit 202 having been turned ON or an operation instruction performed by the user. At a time point T1, the first power reception device 103 is placed on the first power transmission device 101. The first power reception device 103 that has detected the detecting power transmission transmits the presence notification (F401). As illustrated in FIG. 1, the communication range is larger than the power transmittable range in the wireless power transmission system. As a result, the presence notification from the first power reception device 103 can be received by both the first power transmission device 101 and the second power transmission device 102.

In such a case, the second power transmission device 102 receives the presence notification without detecting the presence of an object in its power transmission range, so that the second power transmission device 102 does not respond to the presence notification from the first power reception device 103. On the other hand, the first power transmission device 101 has detected the presence of an object in its power transmission range, that is, has detected the impedance change, so that the first power transmission device 101 starts the authenticating power transmission when receiving the presence notification, and transmits a connection request to the first power reception device 103 that has transmitted the presence notification (F402). Then, the first power transmission device 101 and the first power reception device 103 establish the communication connection, and the authentication processing is executed (F403). When the authentication processing is successful, the first power transmission device 101 generates the random number information, and starts the charging power transmission for the first power reception device 103, with the electromagnetic waves on which the random number information is superimposed (F404).

At a time point T2, the second power reception device 104 is placed on the second power transmission device 102. When the detecting power transmission is detected, the second power reception device 104 transmits the presence notification (F405).

The presence notification from the second power reception device 104 is received by both the first power transmission device 101 and the second power transmission device 102.

In this state, the first power transmission device 101 has already started the authentication processing for the first power reception device 104 and received the presence notification after the predetermined period (for example, 100 ms) has elapsed since the start of the authenticating power transmission. Accordingly, the first power transmission device 101 does not respond to the presence notification from the second power reception device 104. On the other hand, the second power transmission device 102 has detected that an object is in its power transmission range, that is, has detected the impedance change. Accordingly, the second power transmission device 102 starts the authenticating power transmission when receiving the presence notification, and transmits the connection request to the second power reception device 104 that has transmitted the presence notification (F406). Then, the second power transmission device 102 and the second power reception device 104 establish the communication connection, and the authentication processing is executed (F407). When the authentication processing is successful, the second power transmission device 102 generates the random number information, and starts the charging power transmission for the second power reception device 104 with the electromagnetic waves on which the random number information is superimposed (F408).

In FIG. 4, the random number information generated by the first power transmission device 101 is assumed to be different from the random number information generated by the second power transmission device 102. In FIG. 4, the power reception device can easily extract the random number information output from the first power transmission device 101 and the second power transmission device because several start and stop bits are added at the start and the end of the random number information.

At a time point T3, the third power reception device 105 is assumed to be placed on the first power transmission device 101. When the third power reception device 105 detects the charging power transmission, performed by the first power transmission device 101, for the first power reception device 103, the third power reception device 105 extracts the random number information superimposed on the electromagnetic waves used for the power transmission. The third power reception device 105 transmits the presence notification including the extracted random number information (F409). The presence notification from the third power reception device 105 is received by both the first power transmission device 101 and the second power transmission device 102.

When the presence notification is received in the charging power transmission, the first power transmission device 101 and the second power transmission device 102 each determine whether the received presence notification includes random number information that has been superimposed on the electromagnetic waves for the charging power transmission performed thereby. The first power transmission device 101 and the second power transmission device 102 each do not respond to the received presence notification when determining that the presence notification includes no random number information that has been superimposed on the electromagnetic waves for the charging power transmission performed thereby. In other words, the first power transmission device 101 and the second power transmission device 102 each determine that the transmission source of the presence notification, determined to include no random number information that has been superimposed on the electromagnetic waves for the charging power transmission performed thereby, is not in its power transmission range. Each of the first power transmission device 101 and the second power transmission device 102 then performs control so that the connection request is not transmitted to the transmission source. Moreover, the first power transmission device 101 and the second power transmission device 102 each do not set the transmission source of the presence notification, determined to include no random number information that has been superimposed on the electromagnetic waves for the charging power transmission performed thereby, as a target of the charging power transmission.

Here, the presence notification from the third power reception device 105 includes the random number information generated by the first power transmission device 101, so that the second power transmission device 102 does not respond to the presence notification from the third power reception device 105. On the other hand, the first power transmission device 101 transmits the connection request to the third power reception device 105 (F410), because the presence notification from the third power reception device 105 includes the random number information about the first power transmission device 101. The first power transmission device 101 and the third power reception device 105 establish the communication connection, and the authentication processing is executed (F411). When the authentication processing is successful, the first power transmission device 101 superimposes the random number information on the electromagnetic waves used for the charging power transmission for the first power reception device 101 and the third power reception device 105, and starts outputting the electromagnetic waves (F412).

As described above, the power transmission device according to the present exemplary embodiment superimposes the random number information on the electromagnetic waves used for its charging power transmission, and further sets a power reception device, the transmission source of the presence notification including the random number information, as the target of the charging power transmission. In this manner, communication connection for the wireless power transmission can be established between an appropriate set of devices, even when charging power transmission has been started in the environment in which the communication ranges of a plurality of power transmission devices overlap one another. As a result, communication connection is less likely to be erroneously established with a power reception device outside a power transmission range of a power transmission device, and thus communications for performing the wireless power transmission are less likely to be performed between an inappropriate set of devices.

With the power transmission device according to the present exemplary embodiment, power consumption can be prevented from increasing by transmitting power to the power reception device that is not in the power transmission range and involves lower power transmission frequency.

Next, processing executed by the power reception device 300 according to the present exemplary embodiment will be described with reference to a flowchart in FIG. 5.

Figure 5:
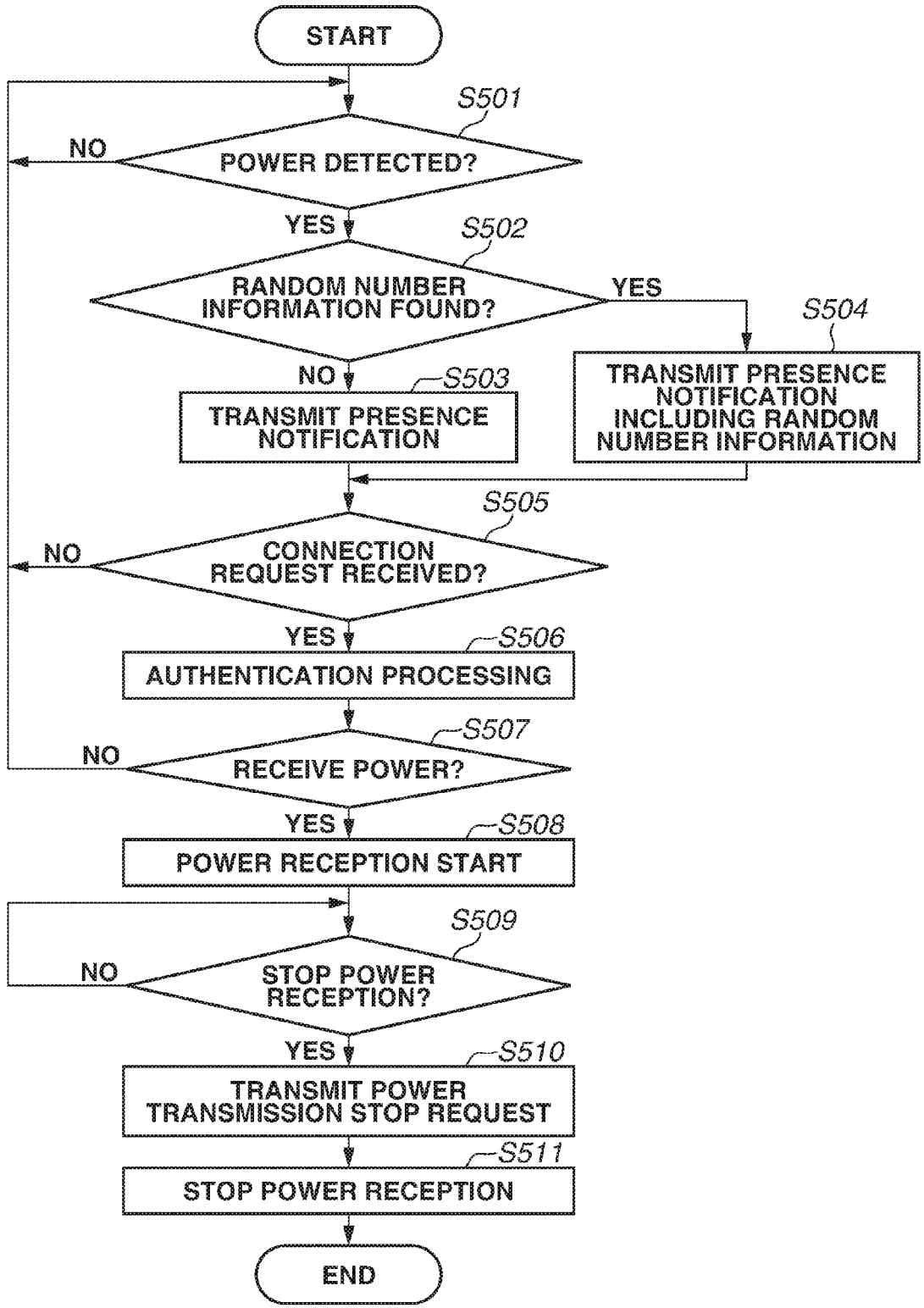
FIG. 5 is a flowchart illustrating processing executed by the power reception device.

The processing in the flowchart illustrated in FIG. 5 is implemented when the control unit 301 executes a control program stored in the memory 308, and executes calculation and processing of information and controls each hardware device. For example, steps in the flowchart illustrated in FIG. 5 may partially or entirely be implemented by hardware such as an application specific integrated circuit (ASIC). The processing in FIG. 5 starts when the power reception device 300 enters the power transmission range of the power transmission device 200.

In step S501, the power reception device 300 determines whether wirelessly supplied power is detected. When the power reception device 300 detects the power (Yes in step S501), the processing proceeds to step S502, where the power reception device 300 determines whether this power signal (electromagnetic waves) is modulated and the random number information is superimposed. When it is determined that the random number information is superimposed (Yes in step S502), the power reception device 300 extracts the random number information. In step S504, the power reception device 300 transmits the presence notification including the random number information thus extracted with the communication unit 306. On the other hand, when it is determined that the random number information is not superimposed (No in step S502), the processing proceeds to step S503 where the power reception device 300 transmits the presence notification using the communication unit 306.

When the presence notification is transmitted, in step S505, the power reception device 300 determines whether the connection request has been received from the power transmission device 200. When no connection request is received from the power transmission device 200 (No in step S505), the processing returns to step 3501 and the processes from the beginning are performed again. Here, the processing may be terminated with an error being displayed. On the other hand, when the connection request is received from the power transmission device 200 (Yes in step S505), the power reception device 300 establishes the communication connection with the power transmission device 200. Then, in step S506, the power reception device 300 performs communications with the communication unit 306 to execute the authentication processing. In step S507, the power reception device 300 determines whether to receive power supplied from the power transmission device, through the authentication processing.

When the authentication processing in step S506 fails and thus the power is not to be received (No in step S507), the processing returns to step S501 to be executed from the begging. Here, the processing may be terminated with an error being displayed. When the authentication processing in step S506 is successful (Yes in step S507), and thus the power is to be received, the processing proceeds to step S508 where the power reception device 300 turns ON the switch 309 to start the power reception. The received power is used by the power reception device 300 to charge the battery 302.

After the power reception starts, in step S509, the power reception device 300 determines whether to stop the power reception. For example, in the determination performed in step S509, the power reception device 300 determines to stop the power reception, when the full charge detection unit 310 detects a fully charged state, or a power reception error occurs. When the power reception is to be stopped (Yes in step S509), the processing proceeds to step S510 where the power reception device 300 transmits a power transmission stop request to the power transmission device 200 using the communication unit 306. In step S511, the power reception device 300 stops the power transmission, and the processing is terminated.

Figure 6:
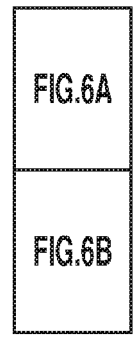
FIG. 6 (consisting of FIGS. 6A and 6B) is a flowchart illustrating processing executed by the power transmission device.
Figure 6A:
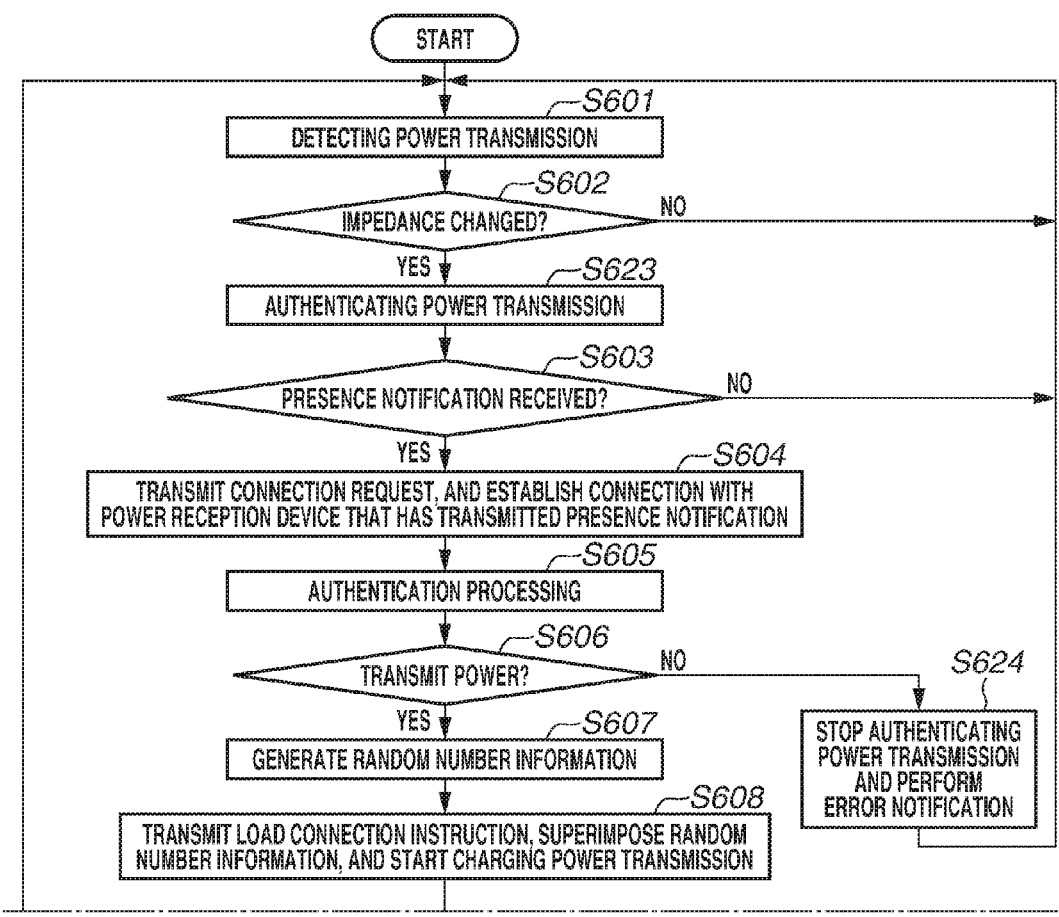
Figure 6B:
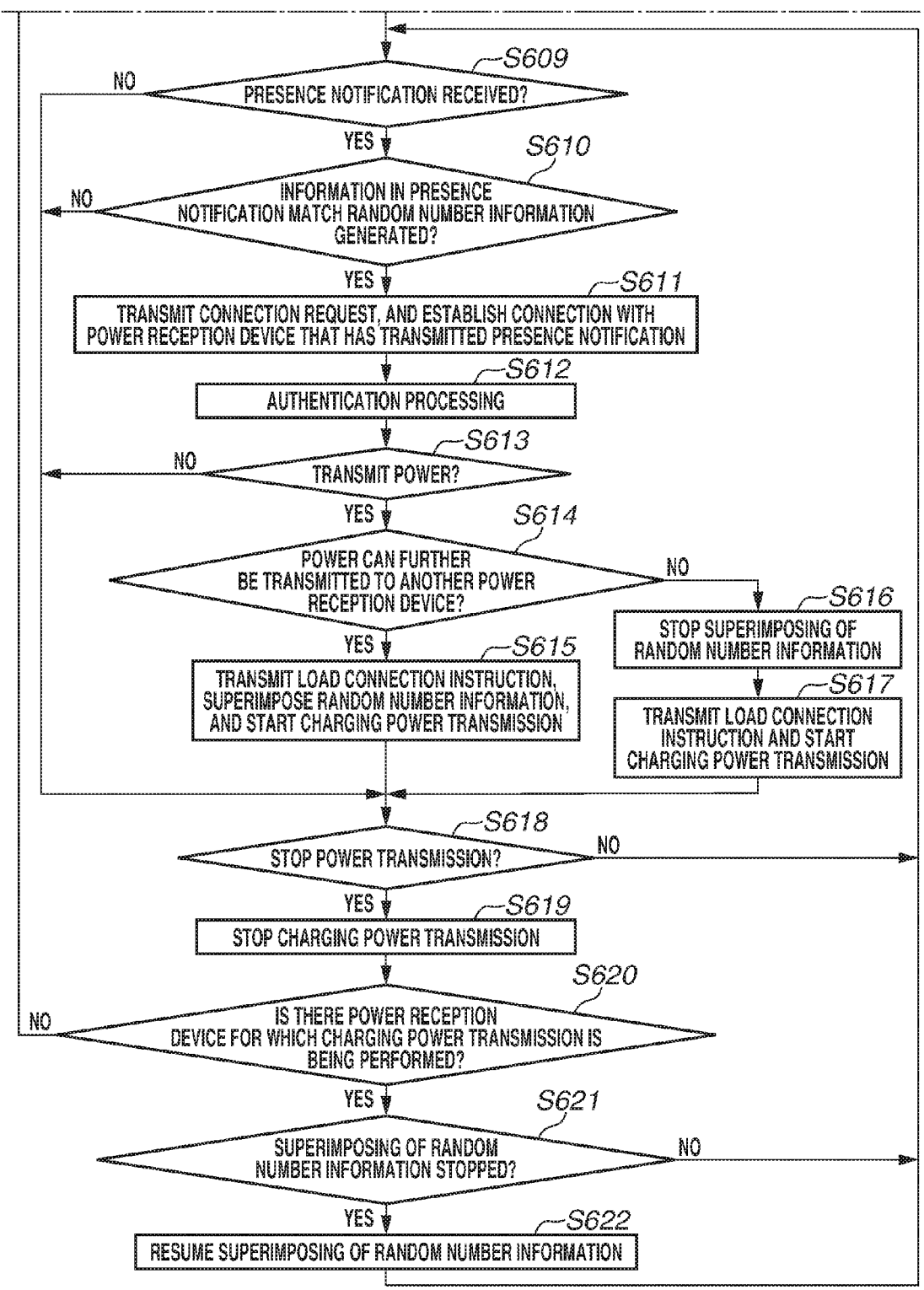

Next, processing executed by the power transmission device 200 according to the present exemplary embodiment will be described below with reference to a flowchart in FIG. 6. The processing in the flowchart illustrated in FIG. 6 is implemented when the control unit 201 executes a control program stored in the memory 208, and executes calculation and processing of information and controls each hardware device. Steps in the flowchart illustrated in FIG. 6 may partially or entirely be implemented by hardware such as an ASIC. The processing illustrated in FIG. 6 starts when the power supply unit 202 of the power transmission device 200 is turned ON. The processing illustrated in FIG. 6 is terminated when the power supply unit 202 of the power transmission device 200 is turned OFF.

When the power supply unit 202 is turned ON or an operation instruction from the user is detected, in step S601, the power transmission device 200 performs the detecting power transmission. Then, in step S601, the control unit 201 of the power transmission device 200 determines whether the impedance change has occurred based on the detection result obtained by the detection unit 204 while the detecting power transmission is being performed. In step S602, when the impedance change is not detected (No in step S602), the processing returns to step S601.

When the impedance change is detected (Yes in step S602), the processing proceeds to step S623 where the power transmission device 200 starts the authenticating power transmission. In step S603, the control unit 201 determines whether the presence notification is received from the power reception device 300 within the predetermined period (for example, 100 ms) after the authenticating power transmission has started. Whether the presence notification is transmitted from the power reception device 300 is determined by whether the received presence notification includes the service information indicating that the wireless power transmission method employed by the system is executable. When no presence notification is received (No in step S603), the authenticating power transmission is stopped, and the processing returns to step S601 and the detecting power transmission is performed again. Here, the processing may be terminated with an error being displayed.

In step S603, when it is determined that the presence notification is received from the power reception device 300 within the predetermined period in step S603 (Yes in step S603), the processing proceeds to step S604 where the power transmission device 200 transmits the connection request using the communication unit 206 to the transmission source of the received presence notification, and establishes the wireless communication connection. Then, in step S605, the power transmission device 200 executes the authentication processing for the power reception device 300 with which the wireless connection has been established in step S604. In the authentication processing, the power transmission device 200 and the power reception device 300 transmits and receives (exchanges) their capability information and information required for the power transmission to and from each other. Then, in step S606, the power transmission device 200 determines whether to transmit power to the power reception device 300 through the authentication processing. The power transmission device 200 determines to transmit power when the authentication processing is successful, and determines not to transmit power when the authentication processing fails. When it is determined not to transmit power to the power reception device 300 with which the wireless connection has been established (No in step S606), the processing proceeds to step S624 where the power transmission device 200 stops the authenticating power transmission and disconnects the communication with the power reception device 300. Then, the processing returns to step S601.

When it is determined to transmit power (Yes in step S606), the processing proceeds to step S607, where the signal generation unit 210 of the power transmission device 200 generates the random number information. The information generated in step S607 may be information unique to the power transmission device 200, such as identification information about the power transmission device 200 for example. In step S608, the power transmission device 200 transmits a load connection instruction signal, instructing the power reception device 300 that has been successfully authenticated, to start the power transmission and turn ON the switch 309, through communication using the communication unit 206. The power reception device 300 that has received the load connection instruction turns ON the switch 309 to prepare for starting of the power supply to the battery 302. Then, in step S608, the power transmission device 200 controls the power transmission unit 203 and the superimpose unit 211 so that the electromagnetic waves on which the information, generated by the signal generation unit 210, is superimposed are started to be output from the antenna 205. In the charging power transmission, the power large enough to charge the battery 302 of the power reception device 300 is transmitted.

In step S609, the power transmission device 200 performing the charging power transmission determines whether the presence notification is received. When the presence notification is received (Yes in step S609), the processing proceeds to step S610 where the power transmission device 200 determines whether the information in the received presence notification matches the random number information output while being superimposed on the electromagnetic waves used for the charging power transmission. When the information in the received presence notification does not match the random number information output while being superimposed on the electromagnetic waves used for the charging power transmission, the power transmission device 200 does not respond to the presence notification. The power transmission device 200 does not set the power reception device 300 that has transmitted the received presence notification as the target of the charging power transmission.

When, in step S610, the information in the received presence notification is determined to match the random number information generated by the power transmission device 200 (Yes in step S610), the processing proceeds to step S611 where the power transmission device 200 transmits the connection request to the power reception device 300 that has transmitted the received presence notification, so that the communication connection is established. Then, in step S612, the power transmission device 200 executes the authentication processing for the power reception device 300 with which the connection has been established in step S611. In step S613, the power transmission device 200 determines whether to transmit power to the power reception device 300 with which the connection has been established in step S611, through the authentication processing. The power transmission device 200 determines to transmit power when the authentication processing is successful, and determines not to transmit power when the authentication processing fails. When it is determined not to transmit power to the power reception device 300 with which the wireless connection has been established in step S611 (No in step S613), the power transmission device 200 disconnects the communication with the power reception device 300. Here, the processing may be terminated with an error being displayed.

When it is determined to transmit power (Yes in step S613), the processing proceeds to step S614, where the power transmission device 200 determines whether the power can be further transmitted to another power reception device, after the power is started to transmit to the power reception device for which the authentication processing has been executed in step S612. When it is determined that the power can be further transmitted to the other power reception device in step S614 (Yes in step 3614), the power transmission device 200 transmits the load connection instruction signal using the communication unit 206 to the power reception device 300 for which the authentication processing has been executed in step S612. Then, in step S615, the power transmission device 200 controls the power transmission unit 203 and the superimpose unit 211 so that the electromagnetic waves, on which the information generated by the signal generation unit 210 has been superimposed, used for the charging power transmission are started to be output.

On the other hand, when it is determined that the power cannot be further transmitted to the other power reception device in step S614 (No in step S614), the processing proceeds to step S616 where the power transmission device 200 controls the superimpose unit 211 so that the superimposing of the information, generated by the signal generation unit 210, on the electromagnetic waves used for the charging power transmission stops. When the superimposing of the information generated by the signal generation unit 210 on the electromagnetic waves used for the charging power transmission stops in step S616, the presence notification received thereafter includes no random number information. Consequently, the power transmission device 200 in a state of not being capable of further transmitting power to another power reception device can be prevented from executing the authentication processing with the other power reception device.

In step S617, when the power transmission device 200 has stopped the superimposing of the information generated by the signal generation unit 210 on the electromagnetic waves used for the charging power transmission, the power transmission device 200 transmits the load connection instruction signal to the power reception device 300 for which the authentication processing has been executed in step S612, through communications performed by the communication unit 206. Then, in step S617, the power transmission device 200 controls the power transmission unit 203 to start the charging power transmission for the power reception device for which the authentication processing has been executed in step S605 and the charging power transmission for the power reception device for which the authentication processing has been executed in step S612.

When the power transmission stop request or the full charge notification is received from the power reception device 300 through the communication unit 206 after the charging power transmission has started, the processing proceeds to step S618 where the control unit 201 of the power transmission device 200 determines to stop the power transmission. When it is determined to stop the power transmission (Yes in step S618), the processing proceeds to step S619 where the power transmission device 200 stops transmitting power to the power reception device 300 that has transmitted the power transmission stop request. When the power transmission stops, the processing proceeds to step S620 where the power transmission device 200 determines whether there is another power reception device for which the charging power transmission is being performed. In step S620, when the power transmission device 200 determines that there is no power reception device for which the power transmission is being performed (No in step S620), the processing returns to step S601. Then the power transmission device 200 executes the processing from step S601 again. In step S620, when the power transmission device 200 determines that the power transmission is being performed for at least one power reception device (Yes in step S620), the processing proceeds to step S621 where the power transmission device 200 determines whether the superimposing of the random number information has been stopped in step S616. When it is determined that the superimposing of the random number information has been stopped in step S616 (Yes in step S621), the processing proceeds to step S622 where the power transmission device 200 resumes the superimposing of the random number information and continues the charging power transmission.

As described above, the power transmission device according to the present exemplary embodiment outputs the electromagnetic waves, on which the random number information is superimposed, used for the charging power transmission, and further sets a power reception device that has transmitted the presence notification, including this random number information, as the target of the charging power transmission. With this configuration, the communication connection for the wireless power transmission can be established between an appropriate set of devices, even when the charging power transmission has started in an environment where communication ranges of a plurality of power transmission devices overlap one another. As described above, the communications for performing the wireless power transmission between an inappropriate set of devices, due to erroneous establishment of the communication connection between a power transmission device and a power reception device not in its power transmission range, are less likely to be performed or prevented.

The power transmission device according to the present exemplary embodiment does not set, as a charging power transmission target, a power reception device that has not transmitted the random number information generated by the power transmission device, that is, does not set a power reception device that is not in its power transmission range as a charging power transmission target. In this manner, the power transmission device according to the present exemplary embodiment can prevent an increase in the power consumption caused by power transmission for a power reception device with low power transmission efficiency.

Other Exemplary Embodiment

In the above-described exemplary embodiment, the wireless power transmission is performed when a power reception device is placed on a power transmission device. Alternatively, the wireless power transmission may be performed even when the power reception device and the power transmission device are spatially apart from each other. For example, the above-described exemplary embodiment may be applied to a configuration where a power transmission device, incorporated in a surface of a floor or a road, performs the wireless power transmission for an electric vehicle serving as the power reception device, in a contactless manner.

In the above-described exemplary embodiment, the power reception device charges the battery. Alternatively, the power reception device may use the received power for purposes other than charging. Examples of such purposes include driving a motor.

In the above-described exemplary embodiment, the power reception device transmits the presence notification including the random number information extracted from the transmitted power. Alternatively, for example, the random number information, transmitted from the power transmission device to the power reception device, may be included in other data such as a message in the authentication processing.

The present invention can also be achieved by the process of supplying a program for implementing one or more functions of the above exemplary embodiments to a system or an apparatus via a network or a storage medium, and causing one or more processors of a computer of the system or the apparatus to read and execute the program. Alternatively, the present invention can also be achieved by a circuit (e.g., an application-specific integrated circuit (ASIC)) for achieving one or more functions.

With the above-described exemplary embodiment, a power transmission device can be prevented from setting a power reception device not present in its power transmission range as a target of power transmission.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-124267, filed Jun. 19, 2015, which is hereby incorporated by reference herein in its entirety.

What is claimed is:

1. A power transmission device comprising:
a first power transmission unit configured to perform wireless power transmission;
a reception unit configured to receive, from a power reception device, a notification signal indicating a presence of the power reception device;
a modulation unit configured to modulate a medium used for the power transmission performed by the first power transmission unit, the medium modulated to transmit predetermined information; and
a control unit configured to cause, in a case where the reception unit receives the notification signal from the power reception device, the first power transmission unit to perform the power transmission to the power reception device that has transmitted the notification signal based on a result of negotiation with the power reception device,
wherein the control unit sets, as a target of the power transmission to be performed by the first power transmission unit, a second power reception device that has transmitted a notification signal including the predetermined information while the first power transmission unit is caused to perform the power transmission, using the medium obtained by the modulation by the modulation unit, to a first power reception device, wherein setting the second power reception device as a target of the power transmission performed by the first power transmission unit is based on a result of a negotiation with the second power reception device.

2. The power transmission device according to claim 1, wherein the control unit does not set the second power reception device as a target of the power transmission to be performed by the first power transmission unit, in a case where the notification signal from the second power reception device does not include the predetermined information.

3. The power transmission device according to claim 1, wherein the predetermined information is information generated based on a random number or identification information about the power transmission device.

4. The power transmission device according to claim 1, further comprising a determination unit configured to determine, in a case where the first power transmission unit is caused to perform the power transmission for the second power reception device based on the result of the negotiation with the second power reception device, whether the first power transmission unit is capable of performing the power transmission for a third power reception device different from the first power reception device and the second power reception device,
wherein, in a case where the determination unit determines that the first power transmission unit is capable of performing the power transmission for the third power reception device, the control unit causes the first power transmission unit to perform power transmission, using the medium obtained by the modulation by the modulation unit, for the first power reception device and the second power reception device, and
wherein, in a case where the determination unit determines that the first power transmission unit is not capable of performing the power transmission for the third power, the control unit causes the first power transmission unit to perform power transmission, using a medium not modulated by the modulation unit, to the first power reception device and the second power reception device.

5. The power transmission device according to claim 1, further comprising:
a second power transmission unit configured to perform power transmission involving smaller power than the power transmission performed by the first power transmission unit, while the power transmission performed by the first power transmission unit is not being performed; and
a detection unit configured to detect an object in a power transmission range based on impedance change due to the power transmission performed by the second power transmission unit,
wherein the control unit is configured to cause the first power transmission unit to perform the power transmission for the first power reception device based on a result of the negotiation with the first power reception device even when the notification signal does not include the predetermined information in a case where the reception unit receives the notification signal from the first power reception device before the first power transmission unit is caused to perform the power transmission, using the medium obtained by the modulation by the modulation unit, to the first power reception device, and after the detection unit detects the object in the power transmission range.

6. The power transmission device according to claim 5, wherein the modulation unit is configured not to modulate a medium, used by the second power transmission unit for the power transmission, to transmit the predetermined information.

7. The power transmission device according to claim 1, wherein the first power transmission unit is configured to perform the power transmission with a power transmission method employing magnetic field resonance system, electromagnetic induction, resonant electric coupling, microwaves, or a laser beam.

8. The power transmission device according to claim 1, wherein the notification signal is an advertise packet defined in Bluetooth Low Energy.

9. The power transmission device according to claim 1, wherein the negotiation is performed based on transmittable power of the power transmission device and power required by a power reception device.

10. A control method for a power transmission device including a transmission unit configured to perform wireless power transmission, a reception unit configured to receive, from a power reception device, a notification signal indicating a presence of the power reception device, and a modulation unit configured to modulate a medium used for the power transmission performed by a first power transmission unit, the medium modulated to transmit predetermined information, the method comprising setting, as a target of the power transmission performed by the first power transmission unit, a second power reception device that has transmitted a notification signal including the predetermined information while the first power transmission unit is caused to perform the power transmission, using the medium obtained by the modulation by the modulation unit, to a first power reception device, wherein setting the second power reception device as a target of the power transmission performed by the first power transmission unit is based on a result of a negotiation with the second power reception device.

11. A storage medium storing therein a program for a power transmission device including a transmission unit configured to perform wireless power transmission, a reception unit configured to receive, from a power reception device, a notification signal indicating a presence of the power reception device, and a modulation unit configured to modulate a medium used for the power transmission performed by a first power transmission unit, the medium modulated to transmit predetermined information, the program causing a computer to execute setting as a target of the power transmission performed by the first power transmission unit, a second power reception device that has transmitted a notification signal including the predetermined information while the first power transmission unit is caused to perform the power transmission, using the medium obtained by the modulation by the modulation unit, to a first power reception device, wherein setting the second power reception device as a target of the power transmission performed by the first power transmission unit is based on a result of a negotiation with the second power reception device.

* * * * *